Figure 1:
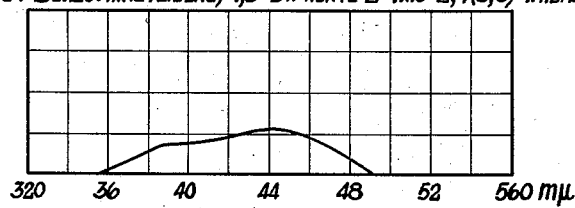

Oct. 24, 1939.  L. G. S. BROOKER  2,177,403
DYE FROM IMIDAZOLONES
Filed Aug. 13, 1936  2 Sheets-Sheet 1

5-(2-Ethyl-1-Benzothiazylidene)-1,3-Diphenyl-2-Thio-2,4(3,5)-Imidazoledione

3-Ethyl-5-(3-Methyl-2-Thiazolinylidene-Ethylidene)-1-Phenyl-2-Thio-2,4(3,5)-Imidazoledione 5-(2-Ethyl-1-Benzoxazylidene-Ethylidene)-3-Methyl-2-Thio-2,4(3,5)-Imidazoledione 5-(2-Ethyl-1-Benzoxazylidene-Ethylidene)-1,3-Diphenyl-2-Thio-2,4(3,5)-Imidazoldione Leslie G. S. Brooker,
INVENTOR:
BY
ATTORNEYS.

Oct. 24, 1939.   L. G. S. BROOKER   2,177,403
DYE FROM IMIDAZOLONES
Filed Aug. 13, 1936   2 Sheets-Sheet 2

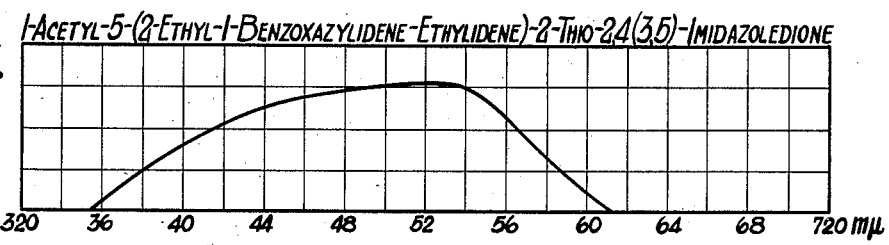

Fig. 5. 1-Acetyl-5-(2-Ethyl-1-Benzoxazylidene-Ethylidene)-2-Thio-2,4(3,5)-Imidazoledione

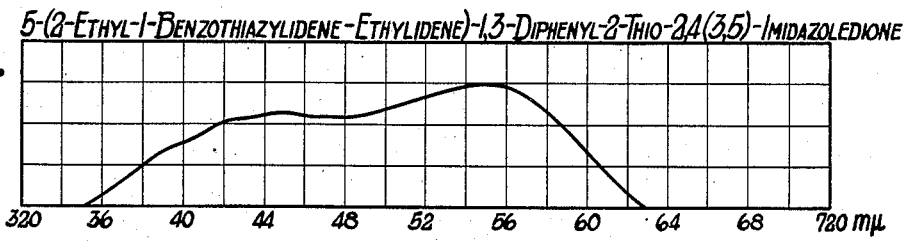

Fig. 6. 5-(2-Ethyl-1-Benzothiazylidene-Ethylidene)-1,3-Diphenyl-2-Thio-2,4(3,5)-Imidazoledione

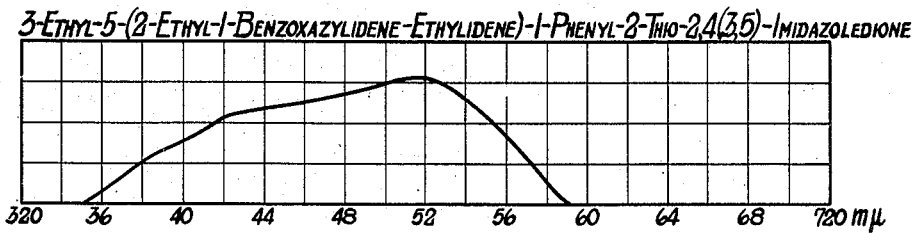

Fig. 7. 3-Ethyl-5-(2-Ethyl-1-Benzoxazylidene-Ethylidene)-1-Phenyl-2-Thio-2,4(3,5)-Imidazoledione

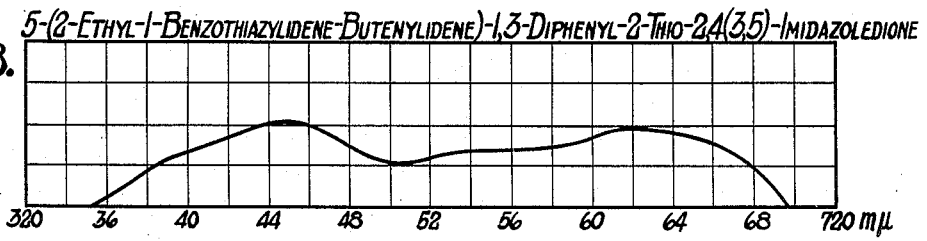

Fig. 8. 5-(2-Ethyl-1-Benzothiazylidene-Butenylidene)-1,3-Diphenyl-2-Thio-2,4(3,5)-Imidazoledione

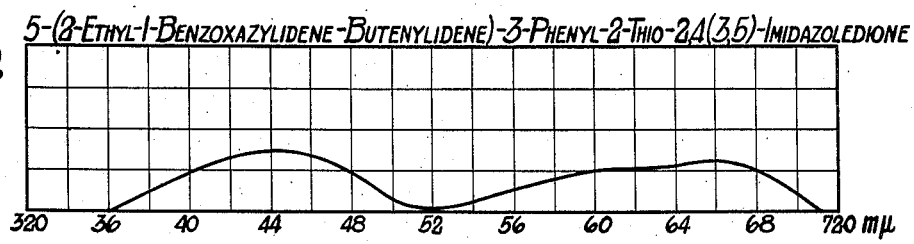

Fig. 9. 5-(2-Ethyl-1-Benzoxazylidene-Butenylidene)-3-Phenyl-2-Thio-2,4(3,5)-Imidazoledione Leslie G. S. Brooker,
INVENTOR.

BY N. M. Perrins
Daniel J. Mayne
ATTORNEYS.

Patented Oct. 24, 1939

2,177,403

UNITED STATES PATENT OFFICE 2,177,403

DYE FROM IMIDAZOLONES

Leslie G. S. Brooker, Rochester, N. Y., assignor, by mesne assignments, to Eastman Kodak Company, Rochester, N. Y., a corporation of New Jersey Application August 13, 1936, Serial No. 95,929
In Great Britain November 15, 1935

19 Claims. (Cl. 260—240)

This invention relates to dyes from imidazolones. More particularly, this invention relates to merocyanine dyes from imidazolones and to a process for the preparation thereof. These merocyanine dyes serve to alter the sensitivity of photographic emulsions.

This application is a continuation-in-part of my copending application, Serial No. 752,036 filed November 8, 1934 (now United States Patent No. 2,078,233, dated April 27, 1937) which is in turn a continuation-in-part of my copending application, Serial No. 739,502, filed August 11, 1934. In my copending application Serial No. 752,036, are described photographic emulsions containing photographic sensitizing dyes characterized by the following grouping:

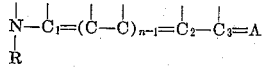

wherein A represents a divalent atom, such as oxygen, or sulfur, $n$ represents a positive integer, R represents an alkyl group, the carbon atom $C_1$ and the nitrogen atom are situated in a heterocyclic ring system and the carbon atoms $C_2$ and $C_3$ are situated in another heterocyclic ring system. In my copending application Serial No. 752,036, these dyes are referred to as N-alkyl-heterocyclylidene, N-alkyl-heterocyclylidene-ethylidene and N-alkyl-heterocyclylidene-butenylidene derivatives of heterocyclic compounds containing a reactive methylene group, depending upon whether $n$ represents 1, 2 or 3. It has recently been proposed to refer to this new class of dyes under the name "merocyanine". Accordingly, when $n$, in the above formula, represents one, the dyes are conveniently referred to as "simple merocyanines", when $n$ represents two, as "merocarbocyanines" and when $n$ represents three, as "merodicarbocyanines", etc.

My copending application Serial No. 752,036 describes specifically photographic emulsions containing simple merocyanine, merocarbocyanine and merodicarbocyanine dyes from rhodanines (2-thio-2,4(3,5)-thiazolediones), 5-thiopyrazolones, 2,4,6 - triketohexahydropyrimidines and 2-thionaphthenones (thioindoxyls). The instant application is directed to merocyanine dyes from imidazolones and to a process for the preparation thereof. These merocyanine dyes from imidazolones can be represented by the following general formulas:

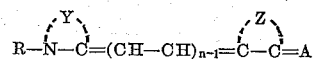

and

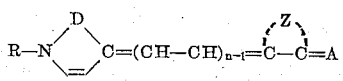

wherein A represents a divalent atom, such as oxygen or sulfur, D represents a radical selected from the group consisting of vinylene and phenylene groups, $n$ represents a positive integer not greater than three, R represents an alkyl group, Y represents the non-metallic atoms necessary to complete a five-membered heterocyclic nucleus, such as an oxazole nucleus (for example oxazole or benzoxazole nuclei), a thiazole nucleus (for example thiazole, benzothiazole or naphthothiazole nuclei), a thiazoline nucleus, a selenazole nucleus (for example selenazole or benzoselenazole nuclei) or a selenazoline nucleus, or Y represents the non-metallic atoms necessary to complete a six-membered heterocyclic nucleus, such as a pyridine nucleus, or a quinoline nucleus (for example quinoline or benzoquinoline), and Z represents the non-metallic atoms necessary to complete an imidazolone nucleus, such as a hydantoin nucleus (for example hydantoin i. e. 2,4(3,5)-imidazoledione or 1-phenylhydantoin i. e. 1-phenyl-2,4(3,5)-imidazoledione), a 2-thiohydantoin nucleus (for example 2-thiohydantoin i. e. 2-thio-2,4(3,5)-imidazoledione, 1-ethyl-2-thiohydantoin i. e. 1-ethyl-2-thio-2,4(3,5)-imidazoledione or 1,3-diphenyl-2-thiohydantoin i. e. 1,3-diphenyl-2-thio-2,4(3,5-imidazoledione), a 4-thiohydantoin nucleus (for example 4-thiohydantoin, i. e. 4-thio-2,4(3,5)-imidazoledione) or a 2-mercapto-5(4)-imidazolone nucleus (for example 2-methylthio-5(4)-imidazolone).

These new simple merocyanine dyes, where $n$ represents one, can be prepared by condensing a cyclammonium quaternary salt, such as an oxazole, a thiazole, a thiazoline, a selenazoline, a selenazole, a pyridine or a quinoline quaternary salt, containing a mercapto group in the alpha or gamma, i. e. one of the so-called reactive, positions, with an imidazolone containing a nuclear reactive carbonyl or thiocarbonyl group, advantageously in the presence of a basic condensing agent. The reaction can be illustrated by reference to the specific condensation of 1-phenyl-thiobenzothiazole ethiodide with hydantoin, in the presence of triethylamine.

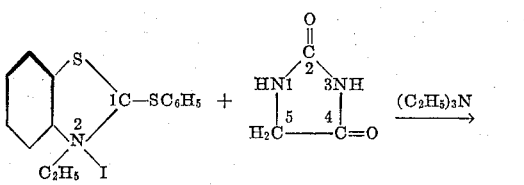

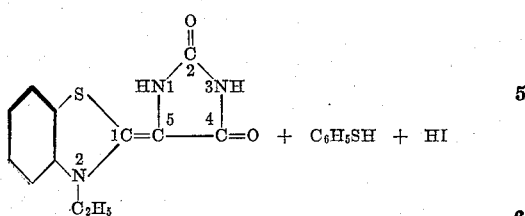

Such a dye is called 5-(2-ethyl-1-benzothiazylidene)-2,4(3,5)-imidazoledione. In carrying out this type of condensation, I have found it advantageous to employ strong tertiary organic bases as condensing agents, although inorganic condensing agents such as sodium carbonate or potassium hydroxide can be used. Heating accelerates the reaction.

The following examples serve to illustrate the procedure employed in preparing these new dyes where $n$ represents one. However, I do not intend that these examples limit my invention in any manner.

EXAMPLE 1.—*3-ethyl-5-(1-ethyl-2-quinolylidene)-1-phenyl-2-thio-2,4-(3,5)-imidazoledione*

3-ethyl-1-phenyl-2-thiohydantoin (1.1 g.; 1.0 mol.) 2-phenylthioquinoline ethiodide (2.1 g.; 1.0 mol.) and triethylamine (0.53 g.; 1.05 mols.) were refluxed for about 15 minutes in 20 cc. of absolute ethyl alcohol. The dye separated from the chilled solution. It was recrystallized from methyl alcohol. The dye was obtained in the form of dark greenish crystals. The dye can be represented by the following formula:

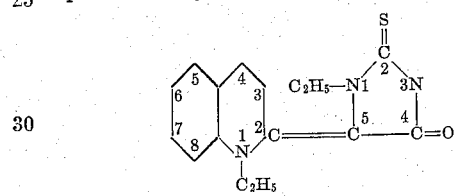

EXAMPLE 2.—*5-(2-ethyl-1-benzothiazylidene)-1,3-diphenyl-2-thio-2,4-(3,5)-imidazoledione*

1,3-diphenyl-2-thiohydantoin (0.9 g.; 1 mol.) 1-methylthiobenzothiazole ethiodide (1.1 g.; 1 mol.) and triethylamine (0.53 g.; 1.05 mols.) were refluxed in 15 cc. of absolute ethyl alcohol for about 15 minutes. The dye separated from the chilled solution. It was recrystallized from glacial acetic acid. The dye was obtained in the form of dull yellow crystals.

The 3-ethyl-1-phenyl-2-thiohydantoin and the 1,3-diphenyl-2-thiohydantoin of the above two examples can be replaced by hydantoin, 2-thiohydantoin, 4-thiohydantoin or their nitrogen substituted derivatives. Likewise, the 1-methylthiobenzothiazole ethiodide and 1-phenylthioquinoline ethiodide can be replaced with other quarternary salts, such as metho-p-toluenesulfonates, dimethyl sulfates, perchlorates, or other alkyl halides for example. Instead of the methylthio and phenylthio derivatives other mercapto derivatives can be used, for example n-butylthio, p-chlorophenylthio, β-naphthylthio, benzothiazylthio or 5-pyrazolonylthio. Instead of the mercapto derivatives of benzothiazole and quinoline quaternary salts, mercapto derivatives of other cyclammonium quarternary salts can be used, for example alkylthio, arylthio or heterocyclothio derivatives of thiazole, oxazole, thiazoline benzothiazole, naphthothiazole, selenazole, naphthoxazole, selenazoline, benzoselenazole, or pyridine quaternary salts. Such dyes are described in the copending application of Leslie G. S. Brooker and Russell H. Van Dyke, Serial No. 29,917, filed July 5, 1935.

The most convenient method for preparing dyes, where $n$ represents one, derived from a 2-mercapto-5(4)-imidazolone is to take a dye made, according to Example 1, from a cyclammonium quarternary salt and a 2-thiohydantoin, which does not contain a substituent, other than hydrogen, in the 1-position, and subject the dye to alkylation. The reaction can be represented as follows:

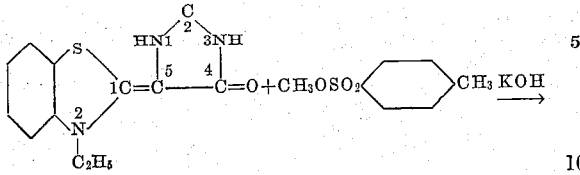

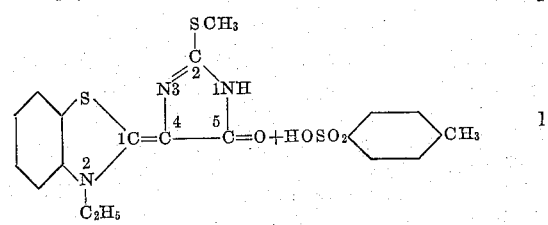

4-(2-ethyl-1-benzothiazylidene)-2-methylthio-5(4)-imidazolone.

The dye to be alkylated (1 mol.) is advantageously suspended in methyl alcohol and powdered potassium hydroxide (1.2 mol.) followed by the alkylating agent (1.2 mol.) is added. Refluxing for a short time, about 30 minutes, is ordinarily sufficient to effect the change and the dye precipitates from the chilled reaction mixture. Other alkylating agents than methyl-p-toluene sulfonate can be used, for example ethyl or butyl-p-toluenesulfonate, methyl iodide or dimethylsulfate, but the toluenesulfonates appear to be more advantageous. The change in numbering of the imidazolone nucleus involved in changing from the 2-thiohydantoin nucleus to the mercapto substituted nucleus is necessary in order to preserve consistency with the numbering of the imidazole nucleus from which the imidazolone nuclei may be considered as being derived.

These new dyes, where $n$ represents two, can be prepared by condensing a cyclammonium quaternary salt, such as an oxazole, a thiazole, a thiazoline, a selenazoline, a selenazole, a pyridine or a quinoline quaternary salt, containing a β-anilinovinyl group in the alpha or gamma, i. e. one of the so-called reactive positions, with an imidazolone containing a reactive methylene group, advantageously in the presence of an acid binding agent. The reaction can be illustrated by reference to the specific condensation of 1-(β-anilinovinyl)-benzoselenazole ethiodide with 4-thiohydantoin, in the presence of acetic anhydride and sodium acetate.

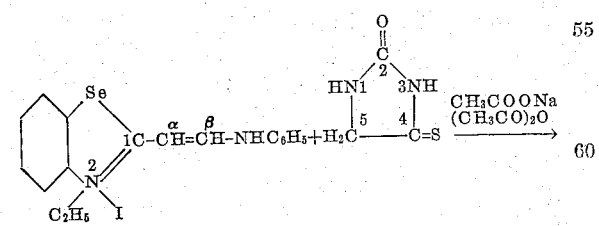

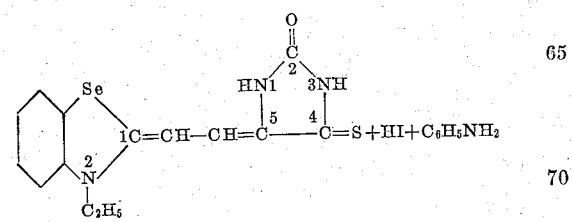

Such a dye is called 5-(2-ethyl-1-benzoselenazylidene-ethylidene)-4-thio-2,4(3,5)-imidazoledione. In carrying out this type of condensation, I have found it advantageous to employ the acetylated β-anilino derivative. The reaction can also be carried out in the presence of a strong organic base, such as triethylamine or piperidine, or an inorganic base, such as sodium carbonate. Heat accelerates the reactions.

The following examples serve to illustrate the procedure employed in preparing these new dyes where n represents two. However, I do not intend that these examples limit my invention in any manner.

EXAMPLE 3.—5-(2-ethyl-1-benzoxazylidene-ethylidene)-3-methyl-2-thio-2,4(3,5)-imidazoledione 3-methyl-2-thiohydantoin (1.3 g.; 1 mol.) prepared according to the method given by Marckwald, Neumark and Stelzner, Ber., 24, 3278 (1891), 1-(β-acetanilidovinylbenzoxazole ethiodide (4.3 g.; 1 mol.) and triethylamine (1.06 g.; 1.05 mols.) were refluxed for about 15 minutes in absolute ethyl alcohol (35 cc.). The dye separated from the cooled reaction mixture. It was twice recrystallized from methyl alcohol. The orange crystals gave a deep yellow solution. The dye can be represented by the following formula:

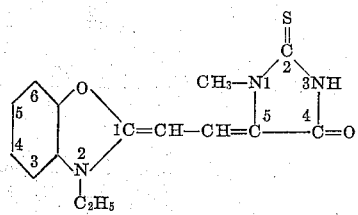

EXAMPLE 4.—1-acetyl-5-(2-ethyl-1-benzoxazylidene-ethylidene)-2-thio-2,4(3,5)-imidazoledione 1-acetyl-2-thiohydantoin (0.8 g.; 1 mol.), prepared according to the directions given by Johnson and Nicolet,—J. Am. Chem. Soc., 33, 1973 (1911), 1-(β-acetanilidovinylbenzoxazole ethiodide (2.2 g.; 1 mol.) and triethylamine (0.53 g.; 1.05 mols.) were refluxed in absolute ethyl alcohol (20 cc.) for about 15 minutes. The dye separated from the cooled reaction mixture. It was recrystallized from acetic anhydride. The orange powder gave a yellow solution in acetic anhydride.

EXAMPLE 5.—5-(2-ethyl-1-benzoxazylidene-ethylidene)-2-thio-2,4(3,5)-imidazoledione 2-thiohydantoin (1.2 g.; 1 mol.), 1-(β-acetanilidovinyl)-benzoxazole ethiodide (4.3 g.; 1 mol.) and triethylamine (1.06 g.; 1.05 mols.) were treated as in Example 4. The dye was recrystallized from glacial acetic acid. The scarlet crystals with a blue reflex gave a yellow solution in acetic acid. 5-(2-ethyl-1-benzothiazylidene-ethylidene)-2-thio-2,4(3,5)-imidazoledione was prepared in the same manner using 1 mol. of 1-(β-acetanilido)-vinylbenzothiazole ethiodide.

EXAMPLE 6.—3-ethyl-5-(3-methyl-2-thiazolinylidene-ethylidene)-1-phenyl-2-thio-2,4(3,5)-imidazoledione 3-ethyl-1-phenyl-2-thiohydantoin (1.1 g.; 1 mol.) 2-(β-anilinovinyl)-thiazoline methiodide (1.7 g.; 1 mol.) and triethylamine (0.53 g.; 1.05 mols.) were treated as in Example 3. The dye was recrystallized from methyl alcohol. The orange-red needles with a bluish reflex gave a deep yellow solution in methyl alcohol. The dye can be represented by the following formula:

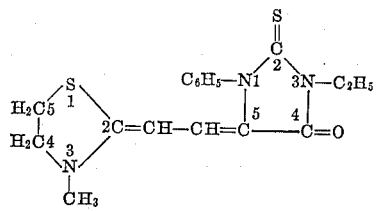

In a similar manner, 3-ethyl-5-(3-methyl-2-thiazylidene-ethylidene)-1-phenyl-2-thio-2,4(3,5)-imidazoledione can be prepared using one molecular proportion of 2-(β-anilinovinyl)-thiazole methiodide.

EXAMPLE 7.—3-ethyl-5-(2-ethyl-1-benzoxazylidene-ethylidene)-1-phenyl-2-thio-2,4(3,5)-imidazoledione 2.2 g. (1 mol.) of 3-ethyl-1-phenyl-2-thiohydantoin (Wheeler and Brautlecht, Am. Chem. J. 45, 446 (1911)), 4.3 (1 mol.) of 1-(β-acetanilidovinyl)-benzoxazole ethiodide and 1.06 g. (1.05 mols.) of triethylamine were heated to boiling on the steam bath with absolute ethyl alcohol (35 cc.) for about 15 minutes. The dye separated from the cooled reaction mixture. After two recrystallizations from glacial acetic acid, the dye was obtained as orange needles with a blue reflex. The dye melted at 266–268° C. with decomposition.

EXAMPLE 8.—5-(2-ethyl-1-benzoxazylidene-ethylidene)-1,3-diphenyl-2-thio-2,4(3,5)-imidazoledione 2.7 g. (1 mol.) of 1,3-diphenyl-2-thiohydantoin (Wheeler and Brautlecht, Am. Chem. J. 45, 446 (1911)), 4.3 g. (1 mol.) of 1-(β-acetanilidovinyl)-benzoxazole ethiodide and 1.06 g. (1.05 mols.) of triethylamine were heated on the steam bath with absolute ethyl alcohol (35 cc.) for about 15 minutes. The dye separated from the cooled reaction mixture. After two recrystallizations from methyl alcohol containing pyridine, the dye was obtained as orange needles, melting at 242–245° C. with decomposition.

EXAMPLE 9.—5-(2-ethyl-1-benzothiazylidene-ethylidene)-1,3-diphenyl-2-thio-2,4(3,5)-imidazoledione 2.7 g. (1 mol.) of 1,3-diphenyl-2-thiohydantoin, 4.5 g. (1 mol.) of 1-(β-acetanilidovinyl)-benzothiazole ethiodide and 1.06 g. (1.05 mols.) of triethylamine were heated on the steam bath with absolute ethyl alcohol (35 cc.) for about 15 minutes. The crude dye separated from the cooled reaction mixture. After two recrystallizations from glacial acetic acid, the dye was obtained as reddish brown crystals melting at 297–299° C. with decomposition and darkening prior to melting. The dye can be represented by the following formula:

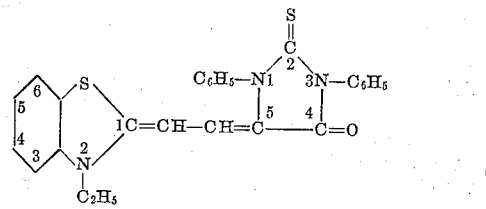

EXAMPLE 10.—5-(2-ethyl-1-benzoxazylidene-ethylidene)-2,4(3,5)-imidazoledione 1.0 g. (1 mol.) of hydantoin, 4.3 g. (1 mol.) of 1-(β-acetanilidovinyl)-benzoxazole ethiodide and 0.9 g. (1.1 mols.) of anhydrous sodium acetate in acetic anhydride were refluxed for about 5 minutes. The dye separated from the cooled reaction mixture. After four recrystallizations from methyl alcohol, the dye was obtained as yellow needles.

EXAMPLE 11.—*5-(2-ethyl-1-benzoxazylidene-ethylidene)-1-phenyl-2-thio-2,4(3,5)-imidazoledione*

0.96 g. (1 mol.) of 1-phenyl-2-thiohydantoin, 2.17 g. (1 mol.) of 1-(β-acetanilidovinyl)-benzoxazole ethiodide and 0.73 g. (1.05 mols.) of triethylamine were refluxed in absolute ethyl alcohol (20 cc.) for about 15 minutes. The dye separated from the cooled reaction mixture. After recrystallization from acetic acid, the dye was obtained as an orange crystalline powder.

EXAMPLE 12.—*5-(2-ethyl-1-benzoxazylidene-ethylidene)-3-phenyl-2-thio-2,4(3,5)-imidazoledione*

1.9 g. (1 mol.) of 3-phenyl-2-thiohydantoin (Wheeler and Brautlecht, Am. Chem. J. 45, 446 (1911)), 4.3 g. (1 mol.) of 1-(β-acetanilidovinyl)-benzoxazole ethiodide and 1.06 g. (1.05 mols.) were refluxed in absolute ethyl alcohol (35 cc.) for about 15 minutes. The dye separated from the cooled reaction mixture. After recrystallization from methyl alcohol containing pyridine, the dye was obtained as a yellow powder.

EXAMPLE 13.—*5-(2-ethyl-1-benzothiazylidene-ethylidene)-4-thio-2,4(3,5)-imidazoledione*

0.58 g. (1 mol.) of 4-thiohydantoin (Johnson and Chernoff, J. Am. Chem. Soc. 34, 1208 (1912)), 2.25 g. (1 mol.) of 1-(β-acetanilidovinyl)-benzothiazole ethiodide and 1.06 g. (1.05 mols.) of triethylamine were refluxed in absolute ethyl alcohol (20 cc.) for about 15 minutes. The dye separated from the cooled reaction mixture. After recrystallization from acetic acid, the dye was obtained as a dull purplish-red powder. The dye can be represented by the following formula:

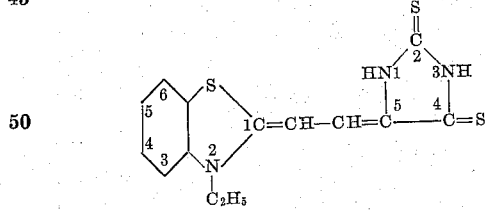

5-(2-ethyl-1-benzoxazylidene-ethylidene)-4-thio-2,4(3,5)-imidazoledione was prepared in the same manner using 1 mol. of 1-(β-acetanilidovinyl)-benzoxazole ethiodide.

EXAMPLE 14.—*5-(1-ethyl-2-quinolylidene-ethylidene)-1,3-diphenyl-2-thio-2,4(3,5)-imidazoledione*

1.35 g. (1 mol.) of 1,3-diphenyl-2-thiohydantoin, 2.0 g. (1 mol.) of 2-(β-anilidovinyl)-quinoline ethiodide, 0.45 g. (1.1 mol.) of anhydrous sodium acetate were refluxed in acetic anhydride (25 cc.) for about five minutes. The dye separated from the cooled reaction mixture. After two recrystallizations from acetic acid, the dye was obtained as dark glittering crystals which gave a purplish-red solution in acetic acid.

In a similar manner β-anilino derivatives of pyridine, benzoselenazole, naphthothiazole, etc. quaternary salts can be condensed with imidazolones.

The most convenient method of preparing dyes where *n* represents two, derived from 2-mercapto-5-(4)-imidazolone is to take a dye made according to Examples 3 or 12, which does not contain a substituent in the 1-position and subject the dye to alkylation. The reaction can be represented as follows:

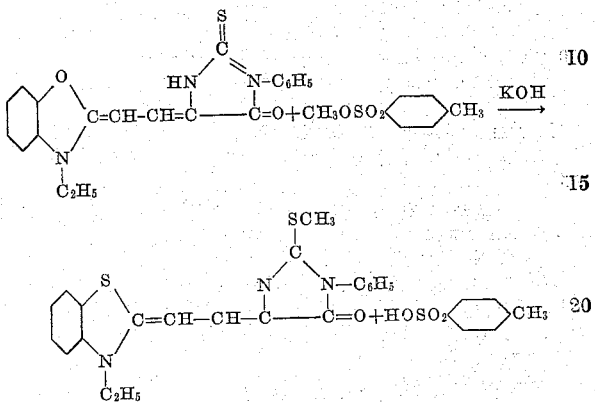

4-(2-ethyl-1-benzoxazylidene-ethylidene)-2-methylthio-1-phenyl-5(4)-imidazolone

The following examples serve to illustrate, but are not intended to limit the preparation of dyes containing a 2-mercapto-5-(4)-imidazolone nucleus.

EXAMPLE 15.—*4(2-ethyl-1-benzoxazylidene-ethylidene)-1-methyl-2-methylthio-5(4)-imidazolone*

0.3 g. (1 mol.) of the dye of Example 3 was suspended in methyl alcohol (20 cc.) and 0.08 g. (1.2 mols.) of 85% powdered potassium hydroxide followed by 0.22 g. (1.2 mols.) of methyl-p-toluenesulfonate were added. The whole was refluxed for about 30 minutes. The dye separated from the cooled reaction mixture and was recrystallized from methyl alcohol. It was obtained in the form of orange-yellow crystals. The dye can be represented by the following formula:

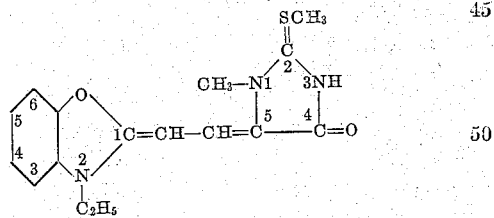

EXAMPLE 16.—*4-(2-ethyl-1-benzoxazylidene-ethylidene)-2-methylthio-1-phenyl-5(4)-imidazolone*

0.18 g. (1 mol.) of the dye of Example 12 was treated with potassium hydroxide and methyl-p-toluenesulfonate as described in the above example. Upon recrystallization from methyl alcohol, the dye was obtained in the form of minute orange crystals.

These new dyes, where *n* represents three, can be prepared by condensing a cyclammonium quaternary salt, such as an oxazole, a thiazole, a thiazoline, a selenazoline, a selenazole, a pyridine or a quinoline quaternary salt, containing an ω-aniline-Δ$^{1,3}$-butadienyl group in the alpha or gamma, i. e. one of the so-called reactive positions, with an imidazolone containing a reactive methylene group, advantageously in the presence of a basic condensing agent. The reaction can be illustrated by reference to the specific condensation of 1-(ω-amilino-Δ$^{1,3}$-butadienyl)-benzothiazole ethiodide with 3-phenyl-2-thiohydantoin, in the presence of triethylamine.

was stirred with ether (60 cc.), filtered and washed with acetone. The product was in the form of reddish brown crystals.

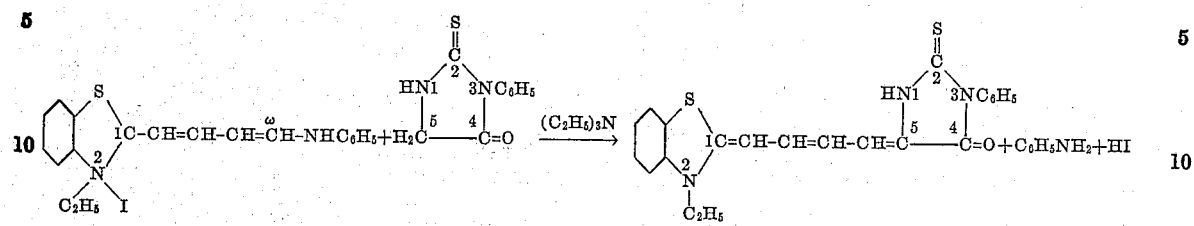

This dye is called 5-(2-ethyl-1-benzothiazylidene-butenylidene)-3-phenyl-2-thio-2,4(3,5)-imidazoledione. In carrying out this type of condensation I have found it advantageous to employ the acetylated ω-anilino derivative. The ω-anilino-γ-bromo-Δ$^{1,3}$-butadienyl derivatives or their acetylated forms can also be used. The reaction can also be carried out in the presence of basic condensing agents, such as sodium carbonate or sodium acetate with acetic anhydride. Heat accelerates the condensations.

The following examples serve to illustrate the procedure employed in preparing these new dyes where $n$ represents three. However, I do not intend that these examples limit my invention in any manner.

EXAMPLE 17. — 5-(2-ethyl - 1-benzothiazylidene-butenylidene) - 3 - phenyl - 2 - thio - 2,4(3,5) - imidazoledione 1 - (ω-acetanilido - Δ$^{1,3}$-butadienyl)-benzothiazole ethiodide was prepared by refluxing 1-methylbenzothiazole ethiodide (3.0 g.; 1 mol.) and β-anilinoacrolein anil hydrochloride (2.5 g.; 1 mol.) in acetic anhydride (20 cc.) for about one hour. The cooled reaction mixture was stirred with ether (50 cc.) and allowed to stand for about 12 hours at about 0° C. The precipitate was filtered and the residue stirred with chilled absolute ethyl alcohol (8 cc.), filtered and stirred with chilled acetone (20 cc.) and again filtered. The product was a dark brown powder.

1 - ω-acetanilido-Δ$^{1,3}$-butadienyl) - benzothiazole ethiodide (1.2 g.; 1 mol.), 3-phenyl-2-thiohydantoin (0.5 g.; 1 mol.) and triethylamine (0.25 g.; 1 mol.) were refluxed for about 10 minutes in 10 cc. of absolute ethyl alcohol. The dye precipitated from the chilled reaction mixture. It was recrystallized from a mixture of pyridine and methyl alcohol. The dull dark green crystals gave a blue solution in methyl alcohol. The dye can be represented by the following formula:

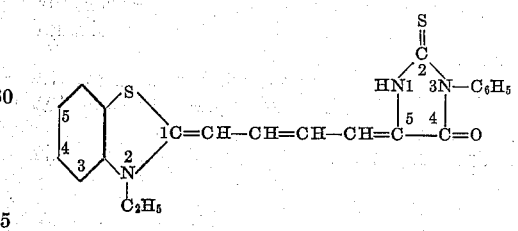

EXAMPLE 18. — 5-(1-ethyl - 2-β-naphthothiazylidene-butenylidene)-1,3-diphenyl - 2 - thio - 2,4 (3,5)-imidazoledione 2 - (ω-acetanilido-Δ$^{1,3}$-butadienyl)-β-naphthothiazole ethiodide was prepared by refluxing 2-methyl-β-naphthothiazole ethiodide (7.0 g.; 1 mol.) and β-anilinoacrolein anil hydrochloride (5.0 g.; 1 mol.) in acetic anhydride (20 cc.) for about one hour. The chilled reaction mixture 2 - (ω-acetanilido-Δ$^{1,3}$-butadienyl)-β-naphthothiazole ethiodide (2.6 g.; 1 mol.), 1,3-diphenyl-2-thiohydantoin (1.2 g.; 1 mol.) and triethylamine (0.5 g.; 1 mol.) were refluxed in absolute ethyl alcohol (20 cc.) for about 10 minutes. The dye precipitated from the chilled reaction mixture. It was washed with hot methyl alcohol and recrystallized from pyridine. The dye was obtained as minute green crystals which gave a blue methyl alcoholic solution.

EXAMPLE 19.—5-(2-ethyl-1-benzoxazylidene - butenylidene) - 1,3-diphenyl-2-thio-2,4(3,5)-imidazoledione 1-(ω-acetanilido-Δ$^{1,3}$-butadienyl) - benzoxazole ethiodide was prepared as indicated for the ω-acetanilido derivatives in the above two examples. (1.2 g.; 1 mol.) of the ω-acetanilido derivative, 1,3-diphenyl-2-thiohydantoin (0.6 g.; 1 mol.) and finely divided anhydrous sodium carbonate (0.25 g.; 2 mols.) were refluxed in absolute ethyl alcohol (10 cc.) for about 30 minutes. The dye separated from the chilled reaction mixture. It was recrystallized from acetone. The bluish purple crystals gave a red solution in methyl alcohol.

In the above examples, 1,3-diphenyl-2-thiohydantoin and 3-phenyl-2-thiohydantoin can be replaced by 3-ethyl-2-thiohydantoin, hydantoin, 4-thiohydantoin, 1-phenyl-4-thiohydantoin or the like. Similarly, 1-methylbenzothiazole, 1-methylbenzoxazole and 2-methyl-β-naphthothiazole ethiodide can be replaced by other alkiodides or other quaternary salts, such as alkyl sulfates, alkyl-p-toluenesulfonates or alkyl bromides, for example. Likewise 1-methylbenzothiazole, 1-methylbenzoxazole, 2-methyl-β-naphthothiazole can be replaced by other nuclei, for example 1-methylbenzoxazole, 1-methyl-α-naphthothiazole, 2-methyl-β-naphthoxazole, quinaldine, lepidine, 1-ethyl-benzothiazole, 2-methylselenazole or the like. The dyes prepared as in the above examples can be alkylated as illustrated in Examples 15 and 16.

As indicated in the above three examples, the basic condensing agent can be a strong organic base, viz. triethylamine. Other strong organic bases suitable for the condensations are piperidine, triethanolamine, tributylamine and the like. Pyridine, though a weaker base, can be used. Still other basic condensing agents suitable for the condensations are potassium carbonate, sodium and potassium hydroxide and sodium ethoxide. Heat accelerates the condensations.

These new merocyanine dyes show a novel sensitizing action in photographic silver salt emulsions, particularly silver chloride and silver bromide emulsions. Accordingly, my invention is particularly directed to the customarily employed silver halide emulsions. However, the light-sensitive material employed in the emulsions of our invention can be any light-sensitive silver salt alone or combined with another light-sensitive silver salt, such as a silver halide. My invention is further particularly directed to the customarily employed gelatin emulsions, gelatin being the carrier or medium in which the light-sensitive salt is suspended. However, any other suitable carrier, such as a cellulose derivative or a synthetic resin, which has substantially no desensitizing effect on the silver salt, can be used.

Figure 2:
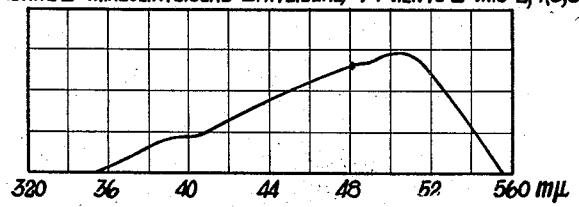
Figure 3:
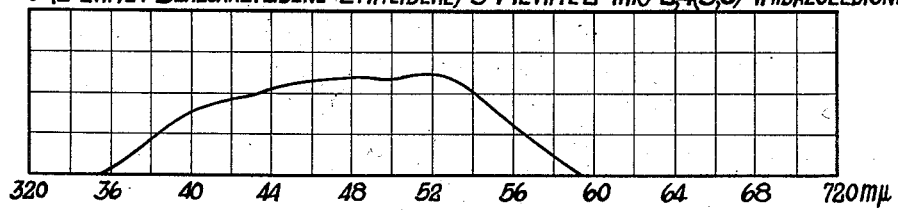
Figure 4:
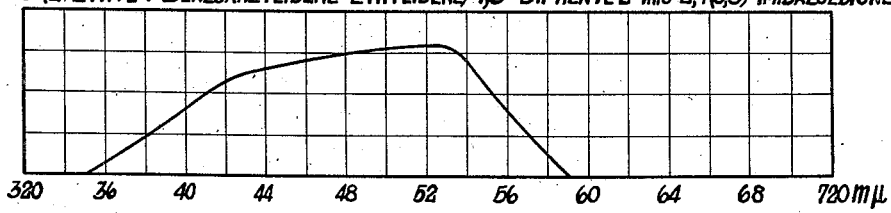

The sensitizing effect of these new dyes will be illustrated with reference to gelatino-silver-chloride emulsions in the case of the simple merocyanine dyes, since it is in these particular emulsions that these dyes are most useful. The sensitizing effect of the merocarbocyanines and merodicarbocyanines will be illustrated with reference to both chloride and bromide emulsions. The illustrations will be made with particular reference to the dyes from 2-thio-2,4(3,5)-imidazolones, as these have proven particularly useful. Fig. 1 of the accompanying drawings illustrates diagrammatically the range and intensity of sensitivity of a silver chloride emulsion containing 5-(2-ethyl-1-benzothiazylidene)-1,3-diphenyl-2-thio-2,4(3,5)-imidazoledione. Fig. 2 illustrates diagrammatically the sensitivity of a chloride emulsion containing 3-ethyl-5-(3-methyl-2-thiazoliny)-1-diphenyl-2-thio-2,4(3,5)-imidazoledione. Fig. 3 illustrates diagrammatically the sensitivity of a silver bromide emulsion containing 5-(2-ethyl-1-benzoxazylidene-ethylidene)-3-methyl-2-thio-2,4(3,5)-imidazoledione. Fig. 4 illustrates diagrammatically the range and intensity of sensitivity of a silver bromide emulsion containing 5-(2-ethyl-1-benzoxazylidene-ethylidene)-1,3-diphenyl-2-thio-2,4(3,5)-imidazoledione. Fig. 5 illustrates diagrammatically the sensitivity of the above silver bromide emulsion containing 1-acetyl 5-(2-ethyl-1-benzoxazylidene-ethylidene)-2-thio-2,4(3,5)-imidazoledione. Fig. 6 illustrates the sensitivty of the above silver bromide emulsion containing 5-(2-ethyl-1-benzothiazylidene-ethylidene)-1,3-diphenyl-2-thio-2,4(3,5)-imidazoledione. Fig. 7 represents the sensitivity of the above silver bromide emulsion containing 3-ethyl-5-(2-ethyl-1-benzoxazylidene-ethylidene)-1-phenyl-2-thio-2,4(3,5)-imidazoledione. Fig. 8 represents the sensitivity of the above silver bromide emulsion containing 5-(2'-ethyl-1-benzothiazylidene-butenylidene)-3-phenyl-2-thio-2,4(3,5)-imidazoledione. Fig. 9 represents the above silver bromide emulsion containing 5-(2-ethyl-1-benzoxazylidene-butenylidene)-3-phenyl-2-thio-2,4(3,5)-imidazoledione. In a similar manner, the other sensitizing dyes of this new group sensitize silver salt emulsions. The nuclei may be substituted by groups such as alkyl, alkoxy, amino, chloro and the like. Some of the herein disclosed dyes show small desensitizing effects together with sensitizing effects in another portion of the spectrum.

In the preparation of photographic emulsions containing these new dyes, it is only necessary to disperse, homogeneously and uniformly, from about 5 to about 100 mg. of the dye or mixture of dyes in about 1000 cc. of the flowable emulsion, the concentration of dye being varied according to the type of light-sensitive salt which goes to make up the emulsion and according to the effects desired. The suitable and most economical concentration for any given emulsion will be apparent to those skilled in the art, upon making the ordinary tests and observations customarily used in the art of emulsion-making. To prepare a gelatino-silver-halide emulsion, the following procedure is satisfactory: A quantity of the dye is dissolved in methyl alcohol and a volume of this solution (which may be diluted with water) containing from 5 to 100 mg. of dye is slowly added to about 1000 cc. of a gelatino-silver-halide emulsion with stirring. Stirring is continued until the dye is uniformly and practically homogeneously dispersed. With the more powerful of these new sensitizing dyes 10 to 20 mg. of dye per 1000 cc. of emulsion suffice to produce the maximum sensitizing effect with the ordinary gelatino-silver-halide emulsions. The above statements are only illustrative and not to be understood as limiting my invention in any sense, as it will be apparent that these dyes can be incorporated by other methods in many of the photographic emulsions customarily employed in the art, such for instance as by bathing, the plate or film, upon which the emulsion has been coated, in a solution of the dye in an appropriate solvent, although such a method is ordinarily not to be preferred. The claims are intended to cover any combination of these new dyes with a photographic silver salt emulsion whereby the dye exerts a sensitizing effect upon the emulsions as well as a photographic element comprising a support, ordinarily transparent, upon which the light-sensitive emulsion is coated or spread and permitted to set or dry.

The herein disclosed dyes, particularly the simple merocyanines and the merocarbocyanines, are useful in the construction of light filters, the simple merocyanines absorbing light of the shorter wavelengths and some ultraviolet. The merocarbocyanines are useful as coloring matters for textiles, particularly cellulose acetate silk or the like. The term "dye" as applied to some of the simple merocyanines is a loose usage, as certain of these possess a pale or scarcely any color.

It is to be understood that the herein disclosed dyes probably exist in two forms which for one group of my new dyes can be illustrated as follows:

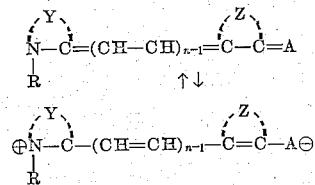

As illustrated these forms are interconvertible one into the other, i. e. the forms are virtual tautomers.

What I claim as my invention and desire to be secured by Letters Patent of the United States of America is:

1. A dye characterized by one of the following two formulas:

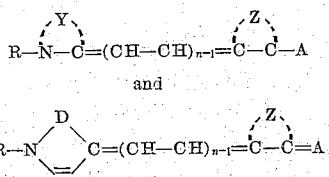

wherein A represents an atom selected from the group consisting of oxygen and sulfur atoms, D represents a radical selected from the group consisting of vinylene and phenylene groups, $n$ represents a positive integer not smaller than two and not greater than three, R represents an alkyl group, Y represents the non-metallic atoms necessary to complete a heterocyclic nucleus selected from the group consisting of five-membered and six-membered heterocyclic nuclei and Z represents the non-metallic atoms necessary to complete an imidazolone nucleus.

2. A dye characterized by the following formula:

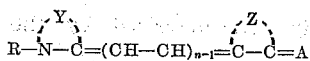

where A represents an atom selected from the group consisting of oxygen and sulfur atoms, $n$ represents a positive integer not smaller than two and not greater than three, R represents an alkyl group, Y represents the non-metallic atoms necessary to complete a five-membered heterocyclic nucleus and Z represents the non-metallic atoms necessary to complete an imidazolone nucleus.

3. A dye characterized by one of the following two formulas:

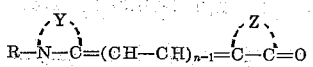

and

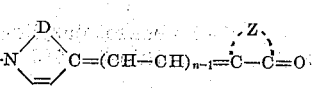

wherein D represents a radical selected from the group consisting of vinylene and phenylene groups, $n$ represents a positive integer not smaller than two and not greater than three, R represents an alkyl group, Y represents the non-metallic atoms necessary to complete a heterocyclic nucleus selected from the group consisting of five-membered and six-membered heterocyclic nuclei and Z represents the non-metallic atoms necessary to complete an imidazolone nucleus.

4. A dye characterized by the following formula:

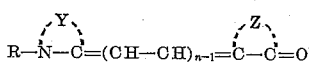

wherein $n$ represents a positive integer not smaller than two and not greater than three, R represents an alkyl group, Y represents the non-metallic atoms necessary to complete a five-membered heterocyclic nucleus and Z represents the non-metallic atoms necessary to complete an amidazolone nucleus.

5. A dye characterized by one of the following two formulas:

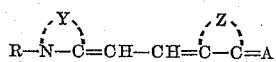

and

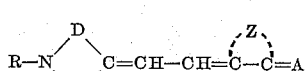

wherein A represents an atom selected from the group consisting of oxygen and sulfur atoms, D represents a radical selected from the group consisting of vinylene and phenylene groups, R represents an alkyl group, Y represents the non-metallic atoms necessary to complete a heterocyclic nucleus selected from the group consisting of five-membered and six-membered heterocyclic nuclei and Z represents the non-metallic atoms necessary to complete an imidazolone nucleus.

6. A dye characterized by the following formula:

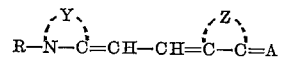

wherein A represents an atom selected from the group consisting of oxygen and sulfur atoms, R represents an alkyl group, Y represents the non-metallic atoms necessary to complete a five-membered heterocyclic nucleus and Z represents the non-metallic atoms necessary to complete an imidazolone nucleus.

7. A dye characterized by one of the following two formulas:

and

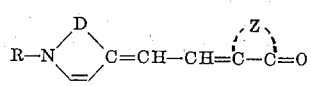

wherein D represents a radical selected from the group consisting of vinylene and phenylene groups, R represents an alkyl group, Y represents the non-metallic atoms necessary to complete a heterocyclic nucleus selected from the group consisting of five-membered and six-membered heterocyclic nuclei and Z represents the non-metallic atoms necessary to complete an imidazolone nucleus.

8. A dye characterized by the following formula:

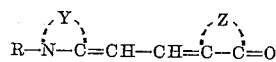

wherein R represents an alkyl group, Y represents the non-metallic atoms necessary to complete a five-membered heterocyclic nucleus and Z represents the non-metallic atoms necessary to complete in imidazolone nucleus.

9. A dye characterized by the following formula:

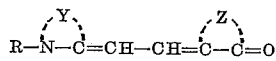

wherein R represents an alkyl group, Y represents the non-metallic atoms necessary to complete an azole nucleus and Z represents the non-metallic atoms necessary to complete an imidazolone nucleus.

10. A dye characterized by the following formula:

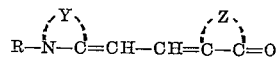

wherein R represents an alkyl group, Y represents the non-metallic atoms necessary to complete an azole nucleus and Z represents the non-metallic atoms necessary to complete a 2-thio-2, 4(3, 5)-imidazoledione nucleus.

11. A dye characterized by the following formula:

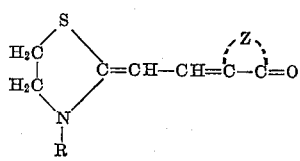

wherein R represents an alkyl group and Z represents the non-metallic atoms necessary to complete a 2-thio-2, 4 (3, 5)-imidazoledione nucleus.

12. A dye characterized by the following formula:

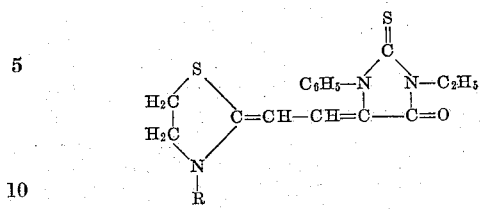

wherein R represents an alkyl group.

13. A dye characterized by the following formula:

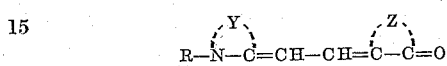

wherein R represents the non-metallic atoms necessary to complete an oxazole nucleus and Z represents the non-metallic atoms necessary to complete a 2-thio-2, 4(3, 5)-imidazoledione nucleus.

14. A dye characterized by the following formula:

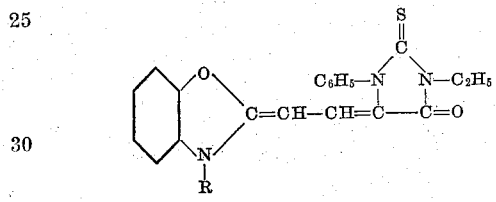

wherein R represents an alkyl group.

15. A dye characterized by the following formula:

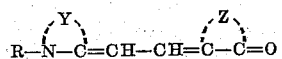

where R represents the non-metallic atoms necessary to complete a thiazole nucleus and Z represents the non-metallic atoms necessary to complete a 2-thio-2, 4 (3, 5)-imidazoledione nucleus.

16. A dye characterized by the following formula:

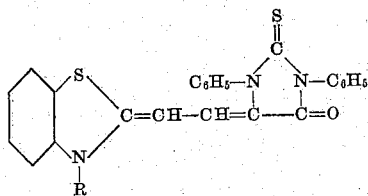

wherein R represents an alkyl group.

17. 3-ethyl-5-(3-methyl - 2 - thiazolinylidene-ethylidene) -1-phenyl-2-thio-2, 4(3, 5) -imidazoledione.

18. 3-ethyl-5(2-ethyl-1-benzoxazylidene-ethylidene) - 1-phenyl-2-thio-2, 4(3, 5)-imidazoledione.

19. 5 - (2 - ethyl - 1 - benzothiazylidene-ethylidene) -1, 3-diphenyl-2-thio-2, 4(3, 5)-imidazoledione.

LESLIE G. S. BROOKER.